(12) United States Patent
Shelton et al.

(10) Patent No.: US 7,929,002 B2
(45) Date of Patent: Apr. 19, 2011

(54) SYSTEM AND METHOD OF PROJECTING AN IMAGE ON A PHYSICAL SUBSTRATE USING A VIRTUAL IMAGE AND A VIRTUAL PLANE

(75) Inventors: Michael James Shelton, Boise, ID (US); William Robert Cridland, Boise, ID (US); Steven Harold Taylor, Boise, ID (US); Jerry Shelton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 921 days.

(21) Appl. No.: 11/891,349

(22) Filed: Aug. 10, 2007

(65) Prior Publication Data
US 2009/0040194 A1 Feb. 12, 2009

(51) Int. Cl.
*G09G 5/00* (2006.01)
*G06F 3/041* (2006.01)
(52) U.S. Cl. ........................................ 345/718; 345/156
(58) Field of Classification Search .................. 345/156, 345/173–182, 1.2, 1.1, 2.2
See application file for complete search history.

(56) References Cited

U.S. PATENT DOCUMENTS

| | | | |
|---|---|---|---|
| 5,448,263 A | 9/1995 | Martin | |
| 6,141,000 A | 10/2000 | Martin | |
| 6,337,681 B1 | 1/2002 | Martin | |
| 6,388,654 B1 * | 5/2002 | Platzker et al. | 345/156 |
| 6,747,636 B2 | 6/2004 | Martin | |
| 6,809,843 B1 | 10/2004 | Youngers | |
| 6,999,061 B2 | 2/2006 | Hara et al. | |
| 2004/0021645 A1 * | 2/2004 | Kobayashi et al. | 345/173 |

* cited by examiner

*Primary Examiner* — Kevin M Nguyen (57) ABSTRACT

A method of projecting an image on a physical substrate using a virtual image and a virtual plane includes generating a virtual two dimensional plane and locating a position and orientation of a wand with respect to the virtual plane. The method further includes creating a virtual image on the virtual plane with the wand. An image can be projected on the physical substrate. The projected image corresponds to the virtual image created on the virtual plane. An associated image projection system includes a virtual two dimensional plane. A wand is configured to create a virtual image on the virtual two dimensional plane. The image projection system also has a physical substrate configured to receive a projected image. The projected image corresponds to the virtual image generated using the wand and the virtual two dimensional plane.

22 Claims, 5 Drawing Sheets

SYSTEM AND METHOD OF PROJECTING AN IMAGE ON A PHYSICAL SUBSTRATE USING A VIRTUAL IMAGE AND A VIRTUAL PLANE

BACKGROUND OF THE INVENTION

Many consumers, particularly those in the global business, education and government arenas, desire to collaborate with colleagues at remote locations. There are numerous modern options available for consumers at remote locations to communicate with each other, such as telephones, fax machines, and e-mail among other things. There are, however, few options available that enable consumers at different locations to collaborate with each other on group projects, joint tasks and the like.

Some limited options include using a chalkboard or whiteboard during a presentation to capture ideas, take notes, and draw images and diagrams. In most cases, the chalkboard or whiteboard is non-shareable for multiple location setups and only those persons located in the same room as the presenter are able to view the chalkboard or whiteboard presentation. Even if the presentation is recorded for viewing by persons at remote locations, it does not provide the capability of instantaneous interaction and collaboration between participants.

More recently, consumers have used a laptop computer/projection combination to give presentations. Here, a software application can be used on a laptop computer to generate a substantial amount of visual and graphical data, which can be projected onto a screen. The images on the laptop may also be projected and viewed on screens at remote locations. Generally, the presenter using this type of system stands by the projector and operates the software on the laptop, while a second person makes notes and annotations with a dry erase marker on the screen or substrate on which the image from the laptop is being projected. Alternatively, the presenter may be able to stand near the projected image and offer his or her presentation. When the presenter wants to make notes, annotations or other graphical images, he or she is required to step down to the laptop to create the graphical data so that it can be viewed by persons at remote locations. Thus, presenters using laptop computer/projection combinations do not have a simple method for capturing hand written data live during a presentation.

More recently, consumers have utilized interactive whiteboards, which provide for spontaneity and ease of sharing ideas between people at different locations. This solution is disadvantageous in that it can be expensive since each participating location or meeting room must be equipped with its own interactive whiteboard. In addition, interactive whiteboards require a variety of accessories, such as pens in various colors and erasers, among other things.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used:

The singular forms "a," "an," and "the" include plural referents unless the context clearly dictates otherwise.

As used herein, the term "virtual" is to be understood to refer to being in effect, not in fact. For example, a virtual whiteboard is one on which an image can be generated, but not seen or touched unless the image is projected onto a physical whiteboard or other physical substrate.

As used herein, the term "remote" refers to a geographical locality that is in a room or other physical location that is not the room wherein the virtual plane is generated.

As used herein, "proximate" refers to a geographical locality that is within the same room or viewing area as the virtual plane and the physical substrate.

As used herein, "projected image" refers to an image that is displayed on a two dimensional plane which can be viewed or seen by a human eye. The projected image can be projected onto a substrate using traditional devices, such as front video projectors, film projectors, rear projectors, slide projectors, overhead projectors, computer displays, and the like. As used herein, "second projected image" refers to a visible image that is projected onto a substrate using traditional devices, such as front video projectors, film projectors, rear projectors, slide projectors, overhead projectors, computer displays, and the like. This second projected image can be projected from a different device than the first projected image, and thus, integrated with the first projected image on the two dimensional plane, or can be digitally integrated with the first projected image and projected from a common projection device.

As used herein, "ultra wide band" refers to a wireless, radio technology for transmitting data spread over a large bandwidth, e.g., greater than 500 MHz, or the like.

With these definitions in mind, reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention. Further, it is noted that the FIGS. are not necessarily drawn to scale, but rather, are drawn to more clearly show embodiments of the present invention. For example, the virtual two dimensional plane may be larger or smaller than the physical substrate depending on the desired application.

The present invention is drawn to a method of projecting an image on a physical substrate using a virtual image and a virtual plane. The present invention is further drawn to an image projection system. Various details are provided herein which are applicable to both of the method of projecting and associated image projection system.

The invention will be described referring to FIGS. 1-5. The same elements are assigned the same numerals throughout the FIGS. so that repeated description can be avoided.

Figure 1:
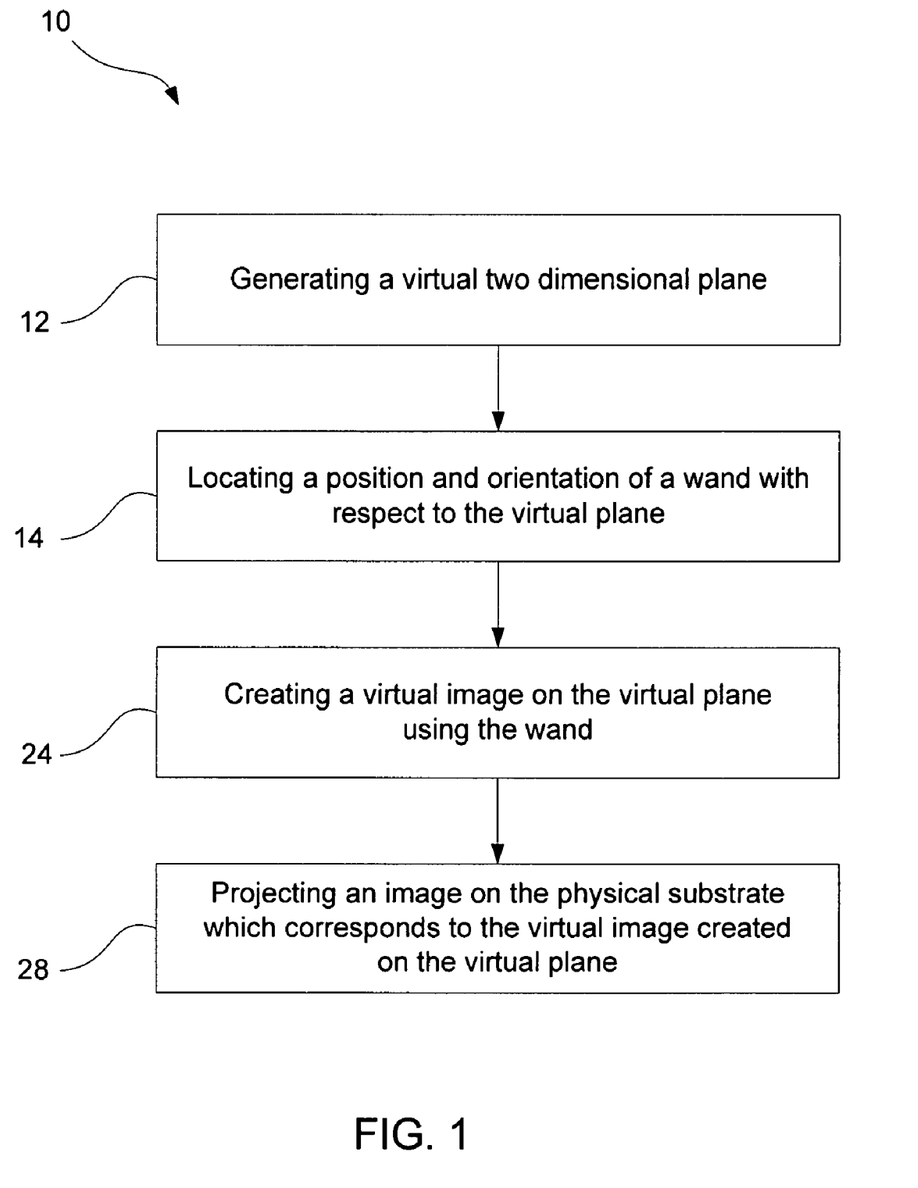
FIG. 1 is a block diagram illustrating a general method of projecting an image on a physical substrate using a virtual image and a virtual plane.
Figure 2:
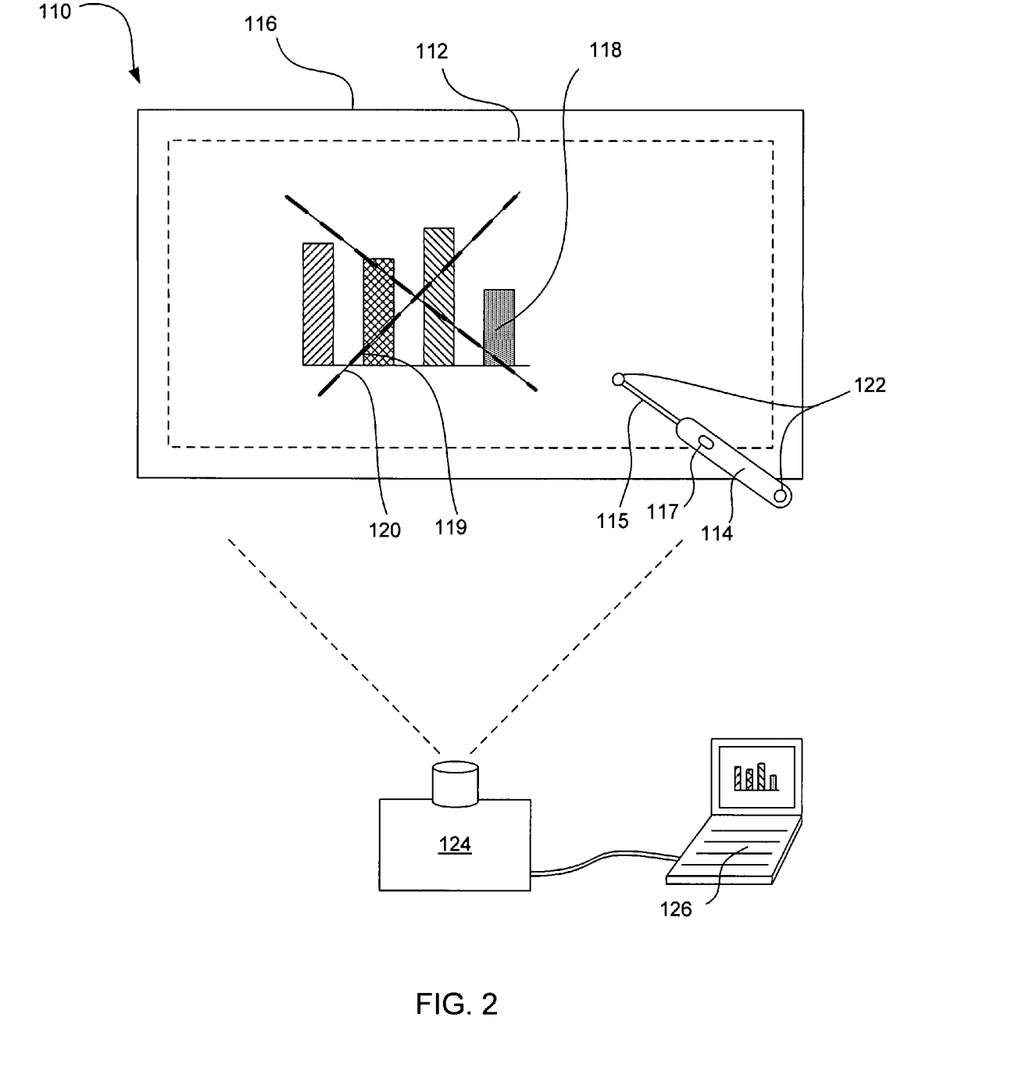
FIG. 2 illustrates an image projection system wherein the virtual two dimensional plane is positioned substantially over the physical substrate.
Figure 3:
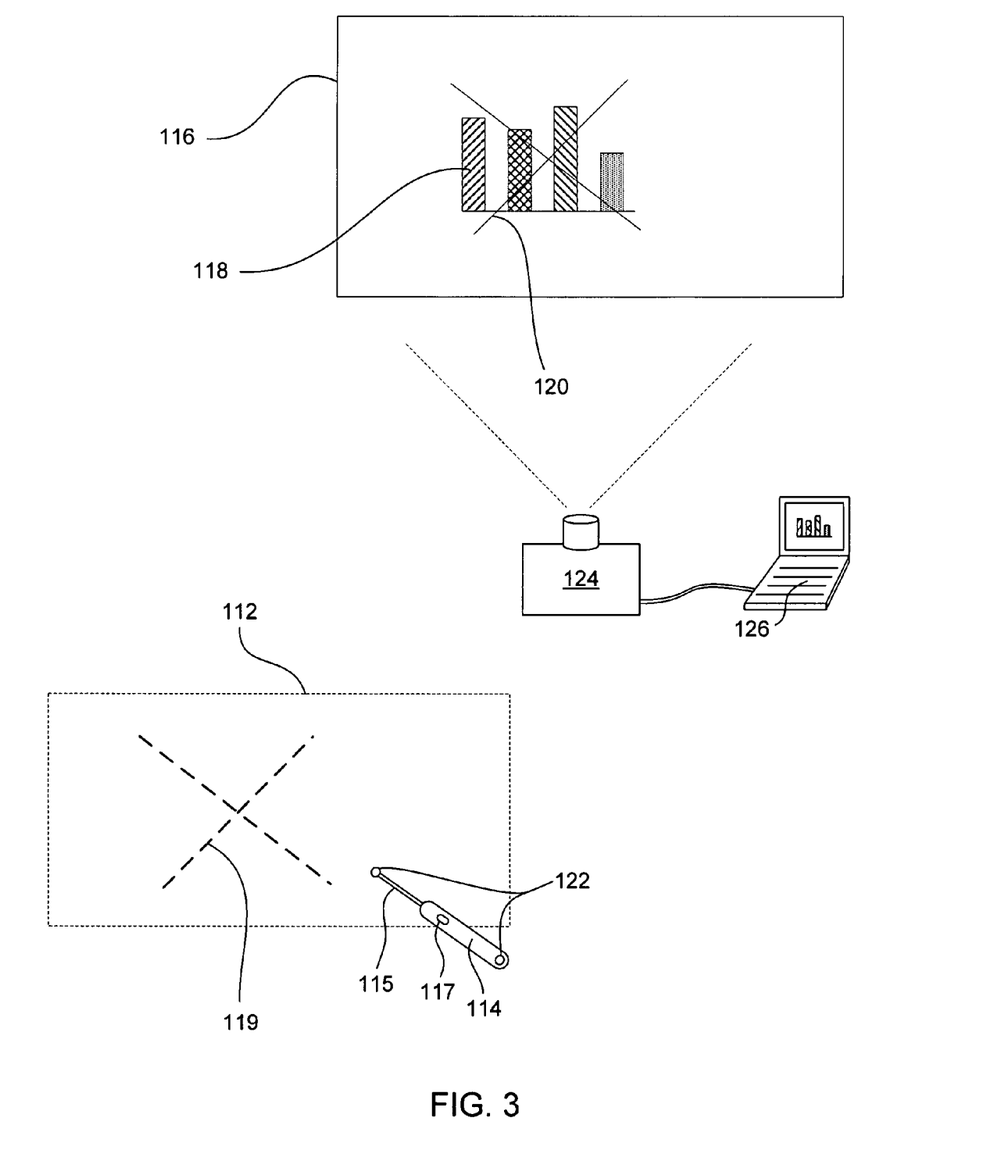
FIG. 3 illustrates an image projection system wherein the virtual two dimensional plane and the physical substrate are positioned in different locations.

FIG. 1 illustrates a method 10 of projecting an image on a physical substrate using a virtual image and a virtual plane, and FIGS. 2-3 illustrate the present system 110. The method includes generating a virtual two dimensional plane, as shown in block 12. The virtual two dimensional plane 112, as shown in FIGS. 2-3, can be generated, for example, in a building or room within a building. Generating the virtual two dimensional plane can be accomplished by using a plurality of transceivers (not shown) that are spatially positioned so as to define and generate the virtual two dimensional plane. Transceivers are known to those skilled in the art and can comprise both a transmitter and a radio receiver.

At least three transceivers can be placed at defined locations within a building or room. Two of the transceivers can be positioned in approximately the bottom corners of one side of the building or room and a third transceiver can be positioned on the opposite side near the top of the building or room. Where at least three transceivers are placed within a building, a virtual two dimensional plane 112 may be generated in more than one room within that building. It is noted that the location and position of the transceivers can be varied to provide acceptable triangulation in order to generate the virtual plane in an appropriate manner in accordance with embodiments of the present invention.

The transceivers can be attached to a computer network within a defined area, and can be assigned a static Internet Protocol or IP address so that they can communicate with each other and with other electronic devices such as a computer on the computer network. In addition, the transceivers can be integrated into meeting room software systems.

Returning to FIG. 1, the method 10 further comprises locating a position and orientation of a wand with respect to the virtual plane, as shown in block 14. As shown in FIGS. 2-3, the wand 114 can have a plurality of transmitters 122 that are sufficiently spaced such that a plurality of at least three transceivers positioned nearby, e.g., in the building or room, can locate the position and orientation of the wand. Transmitters are understood by those skilled in the art and generally refer to an electronic device which can promulgate an electromagnetic signal such as a radio or other telecommunication signal. It is noted that when transmitters are discussed, it is understood that transceivers can alternatively be used, particularly when it is desirable to provide some type of feedback to the wand.

As mentioned, the wand 114 can have two transmitters 122 positioned at opposing ends of the wand, or at least far enough apart so that the triangulating transceivers can differentiate the location of one transmitter over the other. According to one aspect, the wand can be an ultra wide band enabled communication device. In some cases, the wand may be equipped with an antennae 115, which can be extendable. Where the wand comprises an antenna, a transmitter 122 can be placed near the distal end of the antennae. Further, it is noted that the wand may be equipped with a button or switch that, when activated, sends the signal to the transceivers that are used to triangulate the location and position of the wand.

As in FIG. 1, together, generating a virtual two dimensional plane, as shown in block 12, and locating a position and orientation of the wand, as shown in block 14, includes triangulation of the plurality of transceivers to provide a spatial relationship between the position and orientation of the wand with respect to the virtual two dimensional plane. Triangulation is a method of surveying known to those skilled in the art, where a fixed point can be determined based upon the angles to that point from two other fixed points a known distance apart.

Returning to FIGS. 2-3, the step of locating the position and orientation of the wand with respect to the virtual plane may further benefit from calibrating the wand 114. In one aspect, the wand can be pre-programmed to communicate with a single set or defined plurality of transceivers. Calibration can be accomplished by pointing the wand toward a plurality of points on the virtual two dimensional plane 112 and activating a switch or button on the wand to indicate that a specific point is a desired point on the plane. The software can record the coordinates of this point. Once the wand has been calibrated, the position and orientation of the wand with respect to the virtual plane can be tracked.

A software application can be associated with the wand 114 to aid in calibrating the wand and to further enable tracking the position and orientation of the wand. The software application can further be used in connection with a computer 126, such as a laptop that is connected either physically or wirelessly to a projector 124. A light source, such as a light emitting diode (LED) or plurality thereof, can be incorporated into the wand and configured to flash or light up upon receiving a signal from the software. For example, a red LED can flash to alert the user that the wand and software have not established communication with each other, while a green LED can flash to indicate that communication has been established.

In another aspect, a user identifies the location wherein he or she desires to generate the virtual two dimensional plane 112. The location of the virtual two dimensional plane can be such that the virtual two dimensional plane is superimposed over the physical substrate 116. The physical substrate can be selected from the group consisting of walls, whiteboards, chalk boards, presentation screens and the like. The display area of the virtual two dimensional plane does not necessarily have to correlate exactly with the edges of the physical substrate. In use, the physical substrate 116 may or may not include a base image 118 on which the projected image 120 is displayed. The projected image is depicted as an "X" 120 and the virtual image that generates the projected image is depicted as a dashed "X" 119 Although a person looking at the display area will not see the virtual image or the two dimensional virtual plane 112, both of these elements are depicted on the drawings using dashed lines to illustrate the concepts set forth herein.

The base image 118 is generally different than the projected image 120 generated by using the wand 114 and the virtual two dimensional plane 112. In one aspect, the base image can be a second projected image generated by a traditional projector 124 such as an overhead projector, front video projector, film projector, rear projector, computer display and the like. Accordingly, in one example as illustrated in FIGS. 2 and 3, the base image can be an image projected from a computer screen, such as a graph or chart, and the projected image can be an "X" superimposed over the graph or chart.

It is noted that FIG. 2 depicts the virtual two dimensional plane 112 and the physical substrate 116 at approximately the same location. However, the virtual two dimensional plane and the physical substrate can be at different locations, as shown in FIG. 3, though often within the same room or building. For example, a physical substrate, such as a whiteboard, can be positioned on the wall within a room, and the virtual two dimensional plane can be perpendicular with respect to the plane of the whiteboard and positioned away from the whiteboard and near a person giving the presentation.

Figure 4:
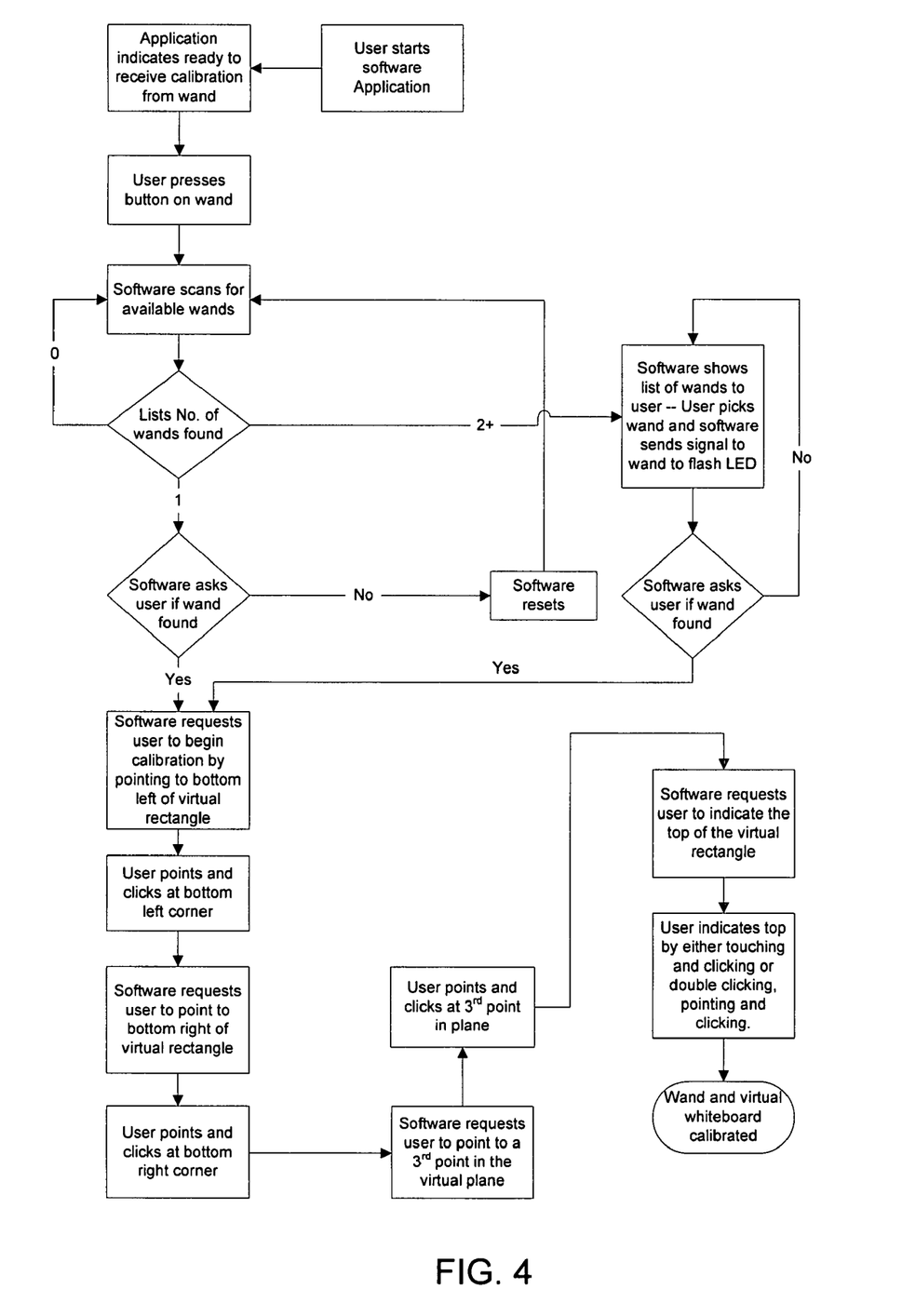
FIG. 4 is a flow chart illustrating one embodiment of calibration of the present system.
Figure 5:
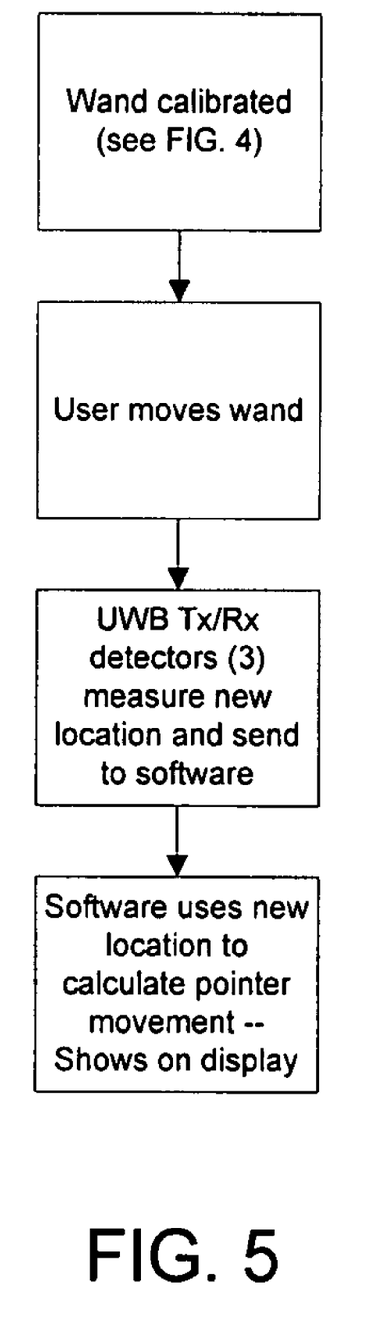
FIG. 5 is a flow chart illustrating one manner in which the movements of a wand are tracked in accordance with the present invention.

Turning now to calibration, FIG. 4 provides a flow chart showing, by way of example, one embodiment of calibrating the present system. Calibration may need to take into account wall thickness for each room in a building in cases where the plurality of transceivers is set up in a building having multiple rooms. A software application can prompt a user to calibrate the wand. The software can scan for available wands and display a list of available wands from which the user can choose. Upon selection of a specific wand, the software can send a signal to the wand to flash a light emitting diode, which may be incorporated into the wand. This way, the user knows that communication has been established between the wand and the software.

The wand can be pre-programmed to communicate with the transceivers in a designated building or room, and thus can determine a plane that the physical substrate represents in three dimensional space. The wand, which can have two ultra wide band transmitters at opposing ends, creates a determinant line in three dimensional space. This enables the software application, which is configured to track the wand, to determine the point whereat the determinant line and the virtual two dimension plane intersect. This can be especially useful where the physical substrate is positioned up high and it is difficult or impractical for the presenter to directly touch the physical substrate.

Assuming that communication is established between the wand, plurality of transceivers, and software application, the software can prompt the user to proceed with calibration of the system. The user can point or touch the wand to three points on the physical substrate to generate the virtual two dimensional plane that can represent the substrate. For example, the wand can be pointed directly up to the desired bottom corners of the display area. When pointed to a desired corner, a signal can be sent from the wand to the software application to indicate that the location of the point is a corner of the desired display area. In a preferred aspect, the wand may be equipped with a button or switch that when activated sends the signal to the associated software application. In addition, the software can send a signal to the wand and causing a LED on the wand to flash, to verify that the software has recorded the location of the corners of the plane. To enable the user to identify the location whereat the wand is pointing, the wand can be equipped with an illumination source, such as a light emitting diode, that can act in a manner similar to that of a laser pointer.

The user can also point the wand toward a point near a vertical mid-line of the physical substrate that is slightly higher but preferably still near the bottom of the desired display area than the designated bottom corner points. Upon establishment of the corner points and midpoint, the software application can begin to generate and identify the virtual two dimensional plane.

Calibration may further include pointing the wand in a general direction toward the physical substrate. Two upper corner points can be generated by the software application. In addition, the point of intersection between the line created by the transmitters in the wand and the virtual two dimensional plane can be established. This point of intersection can function as an origin or base from which the position and orientation of the wand with respect to the virtual plane can be tracked by the software application.

An image, such as a dot, can be generated by the software to indicate the location on the virtual two dimensional plane to which the wand is pointing. Accordingly, movement of the dot on the virtual two dimensional plane corresponds directly to the movement of the wand with respect to the virtual two dimensional plane. The user can point this dot at the two upper corner points of the display area generated by the software application. The user can further send a signal from the wand to the software application by activating the button or switch to verify the desired location of the upper corner points. Upon establishment of the two upper corner points, a complete clipping rectangle can be established to represent a bounded area within a two dimensional plane, which is different than the virtual two dimensional plane.

A virtual image can be created or drawn on the virtual two dimensional plane using the wand, as shown in block 24 of FIG. 1. This can be accomplished by moving the wand and changing the position and orientation of the wand with respect to the virtual two dimensional plane. The software tracks and records the movement and location of the wand, which is shown by way of example, in FIG. 4.

According to the embodiment illustrated by the flow chart in FIG. 4, following calibration of the system, the user can move the wand. The ultra wide band transceivers measure the coordinates of each new location of the wand with respect to the virtual two dimensional plane. The transceivers can send this data to the software, which calculates pointer movement and can generate a visual image corresponding to the movement of the wand.

Preferably, the wand is configured to create or draw the virtual image on the virtual two dimensional plane, and is further sized so that it can be held and easily manipulated by the user of the system. The drawn virtual image can be projected on the physical substrate, as shown in block 28 of FIG. 1. The physical substrate can be configured to receive a projected image which corresponds to the virtual image generated using the wand and the virtual two dimensional plane. Thus, for example, if a virtual "X" is drawn on the virtual two dimensional plane, an "X" will be projected on the physical substrate.

The wand can be equipped with a variety of features that affect the appearance of the projected image. According to one aspect, the wand can have a draw button or switch. This can be the same button or switch that is activated when calibrating the wand with respect to the virtual two dimensional plane. Alternatively, the wand can comprise a plurality of buttons, switches, dials and/or wheels, each of which can be used for a different purpose. When the draw button is activated an image corresponding to the movements of the wand with respect to the virtual plane, will be displayed on the physical substrate.

Alternatively, a user can deactivate the draw button so that the movement of the wand will not produce a virtual image, but rather will only act as a pointing device similar to that of a laser pointer. In one aspect the wand can be further configured to include a light source similar to that includes in a traditional laser pointer, such as a light emitting diode (LED).

In a preferred aspect, the wand can be configured to draw in a color selected by a person using the wand and associated system. For example, the wand can be equipped with buttons, switches or wheels that determine the color of the projected image. Accordingly, a single wand can be used to produce a plurality of colors, including but not limited to red, blue, green, yellow, and black. By way of specific example, the wand may include a wheel that allows the user to scroll through a variety of color selections by rotating the wheel. In addition, the fine grain detection capabilities associated with the ultra wide band enabled wand can enable the wand to draw or create images in a variety of modes, including but not limited to simple pointing, writing text, controlling software applications and drawing complex diagrams. Some features integrated into the wand may further enable the user to select the fineness or coarseness of the drawing lines, and erase existing images and lines.

The projected image on the physical substrate can be in the same room as the virtual two dimensional plane. In addition, the virtual two dimensional plane and the virtual image can generate the projected image on a physical substrate at least at one location that is remote with respect to the location of the virtual plane. For example, the virtual two dimensional plane may be generated and established in one room within a building and a physical substrate can be placed in another room within the building. As the wand is moved with respect to the virtual two dimensional plane in one room, the projected image can be viewed on a physical substrate in another room. In addition, the virtual two dimensional plane and the virtual image may generate at least two projected images on two physical substrates. One of the projected images can be remote with respect to the location of the virtual two dimensional plane, and the other can be proximate with respect to the location of the virtual plane.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method of projecting an image on a physical substrate using a virtual image and a virtual plane, comprising:
    generating a virtual two dimensional plane;
    locating a position and orientation of a wand with respect to the virtual plane;
    creating a virtual image on the virtual plane using the wand; and
    projecting an image on the physical substrate which corresponds to the virtual image created on the virtual plane;
    wherein the virtual two dimensional plane and the virtual image generates the image on the substrate at least at one location that is remote with respect to the location of the virtual two dimensional plane.

2. The method of claim 1, further comprising tracking the position and orientation of a wand with respect to the virtual plane.

3. The method of claim 1, wherein the steps of generating the virtual two dimensional plane and locating the position and orientation of the wand with respect to the virtual two dimensional plane comprises triangulating a plurality of transceivers to provide a spatial relationship between the position and orientation of the wand with respect to the virtual two dimensional plane.

4. The method of claim 3, wherein locating the position and orientation of the wand with respect to the virtual plane further comprises calibrating the wand by pointing the wand toward a plurality of points on the virtual two dimensional plane.

5. The method of claim 4, wherein the step of creating a virtual image comprises moving the wand and changing the position and orientation of the wand with respect to the virtual two dimensional plane.

6. The method of claim 1, wherein the virtual two dimensional plane and the virtual image generates at least two images on two substrates, one of which being remote with respect to the location of the virtual plane, and one of which being proximate to the location of the virtual two dimensional plane.

7. A method of projecting an image on a physical substrate using a virtual image and a virtual plane, comprising:
    generating a virtual two dimensional plane;
    locating a position and orientation of a wand with respect to the virtual plane;
    creating a virtual image on the virtual plane using the wand; and
    projecting an image on the physical substrate which corresponds to the virtual image created on the virtual plane;
    wherein the substrate includes a second projected image that is different than the projected image generated by using the wand and the virtual two dimensional plane.

8. An image projection system comprising:
    a virtual two dimensional plane;
    an ultra wideband enabled communication wand configured to create a virtual image on the virtual two dimensional plane; and
    a physical substrate configured to receive a projected image which corresponds to the virtual image generated using the wand and the virtual two dimensional plane.

9. The image projection system of claim 8, wherein the virtual two dimensional plane is generated by using at least three transceivers that are spatially positioned so as to define and generate the virtual two dimensional plane.

10. The image projection system of claim 9, wherein the wand comprises a plurality of transmitters that are sufficiently spaced such that a plurality of the at least three transceivers can locate the position and orientation of the wand.

11. The image projection system of claim 10, wherein the wand comprises two transmitters, the transmitters being positioned at opposing ends of the wand.

12. The image projection system of claim 8, wherein the wand further comprises an antennae.

13. The image projection system of claim 8, wherein the wand is configured to draw virtual images on the virtual two dimensional plane.

14. The image projection system of claim 13, wherein the wand is further configured to draw in a color selected by a user of the system.

15. The image projection system of claim 8, wherein the physical substrate is selected from the group consisting of walls, whiteboards, chalk boards, and presentation screens.

16. The image projection system of claim 8, where in the physical substrate comprises a base image on which the projected image is displayed.

17. The image projection system of claim 16, wherein the base image is a second projected image.

18. A method of projecting an image on a physical substrate using a virtual image and a virtual plane, comprising:
    generating a virtual two dimensional plane;
    locating a position and orientation of a wand with respect to the virtual plane;
    creating a virtual image on the virtual plane using the wand;
    projecting an image on the physical substrate which corresponds to the virtual image created on the virtual plane; and
    superimposing the virtual two dimensional plane over the physical substrate.

19. The method of claim 18, further comprising tracking the position and orientation of a wand with respect to the virtual plane.

20. The method of claim 18, wherein the steps of generating the virtual two dimensional plane and locating the position and orientation of the wand with respect to the virtual two dimensional plane comprises triangulating a plurality of transceivers to provide a spatial relationship between the position and orientation of the wand with respect to the virtual two dimensional plane.

21. The method of claim 18, wherein locating the position and orientation of the wand with respect to the virtual plane further comprises calibrating the wand by pointing the wand toward a plurality of points on the virtual two dimensional plane.

22. The method of claim 18, wherein the step of creating a virtual image comprises moving the wand and changing the position and orientation of the wand with respect to the virtual two dimensional plane.

* * * * *

UNITED STATES PATENT AND TRADEMARK OFFICE
CERTIFICATE OF CORRECTION

| | | |
|---|---|---|
| PATENT NO. | : 7,929,002 B2 | Page 1 of 1 |
| APPLICATION NO. | : 11/891349 | |
| DATED | : April 19, 2011 | |
| INVENTOR(S) | : Michael James Shelton et al. | |

It is certified that error appears in the above-identified patent and that said Letters Patent is hereby corrected as shown below:

In column 8, line 48, in Claim 16, delete "where in" and insert -- wherein --, therefor.

Signed and Sealed this
Thirteenth Day of December, 2011

David J. Kappos
*Director of the United States Patent and Trademark Office*